US008854364B1

(12) United States Patent
Voorhies

(10) Patent No.: US 8,854,364 B1
(45) Date of Patent: *Oct. 7, 2014

(54) TIGHT DEPTH RANGE OCCLUSION PREDICTION SYSTEM AND METHOD

(75) Inventor: Douglas A. Voorhies, Menlo Park, CA (US)

(73) Assignee: Nvidia Corporation, Santa Clara, CA (US)

(*) Notice: Subject to any disclaimer, the term of this patent is extended or adjusted under 35 U.S.C. 154(b) by 88 days.

This patent is subject to a terminal disclaimer.

(21) Appl. No.: 11/397,528

(22) Filed: Apr. 3, 2006

Related U.S. Application Data

(63) Continuation-in-part of application No. 10/745,160, filed on Dec. 22, 2003, now Pat. No. 8,390,619, and a continuation-in-part of application No. 10/745,277, filed on Dec. 22, 2003, now Pat. No. 8,269,769.

(51) Int. Cl.
```
G06T 15/40    (2011.01)
G06T 15/00    (2011.01)
G06T 15/10    (2011.01)
G09G 5/00     (2006.01)
```

(52) U.S. Cl.
USPC .......... 345/421; 345/419; 345/422; 345/427; 345/620; 345/629

(58) Field of Classification Search
None
See application file for complete search history.

(56) References Cited

U.S. PATENT DOCUMENTS

| | | | |
|---|---|---|---|
| 4,958,305 A * | 9/1990 | Piazza | 345/427 |
| 5,043,921 A | 8/1991 | Gonzalez-Lopez et al. | |
| 5,369,741 A * | 11/1994 | Hartog et al. | 345/443 |
| 5,583,974 A * | 12/1996 | Winner et al. | 345/422 |
| 5,596,686 A * | 1/1997 | Duluk, Jr. | 345/422 |
| 5,694,143 A | 12/1997 | Fielder et al. | |
| 5,751,291 A | 5/1998 | Olsen et al. | |
| 5,761,400 A * | 6/1998 | Derby et al. | 345/422 |
| 5,909,595 A | 6/1999 | Rosenthal et al. | |
| 5,914,721 A | 6/1999 | Lim | |
| 5,990,904 A | 11/1999 | Griffin | |
| 6,046,746 A | 4/2000 | Deering | |
| 6,052,128 A * | 4/2000 | Narayanaswami et al. | 345/620 |
| 6,052,129 A * | 4/2000 | Fowler et al. | 345/620 |
| 6,091,428 A | 7/2000 | Piazza et al. | |
| 6,094,200 A | 7/2000 | Olsen et al. | |
| 6,172,760 B1 | 1/2001 | Son et al. | |
| 6,246,415 B1 | 6/2001 | Grossman et al. | |

(Continued)

OTHER PUBLICATIONS

Michael D. McCool, Chris Wales, Kevin Moule, "Incremental and Hierarchical Hilbert Order Edge Equation Polygon Rasterization," Aug. 2001, Proceedings of the ACM SIGGRAPH/EUROGRAPHICS Workshop on Graphics Hardware, pp. 65-72.*

(Continued)

*Primary Examiner* — Tize Ma

(57) ABSTRACT

The range of depth values within the overlap of a convex polygon and a square or rectangular rasterization area can be determined by identifying whether the minimum and maximum depth values occur at the corners of the rasterization area or at intersections of the polygon's edges with the area's sides. By choosing between the corner and intersection for both the minimum and maximum depth limit, solving the depth plane equation at the chosen location, and clamping against the polygon's vertex depth range, a tight depth range describing the depth values within that overlap are obtained. That tight depth range is utilized to cull pixel values early in the pipeline, improving performance and power consumption.

18 Claims, 10 Drawing Sheets

(56) References Cited

U.S. PATENT DOCUMENTS

| | | | |
|---|---|---|---|
| 6,323,860 B1 * | 11/2001 | Zhu et al. | 345/427 |
| 6,373,485 B2 | 4/2002 | Sowizral et al. | |
| 6,407,741 B1 | 6/2002 | Morein et al. | |
| 6,445,390 B1 * | 9/2002 | Aftosmis et al. | 345/421 |
| 6,476,807 B1 | 11/2002 | Duluk, Jr. et al. | |
| 6,480,205 B1 * | 11/2002 | Greene et al. | 345/631 |
| 6,525,726 B1 * | 2/2003 | Xie et al. | 345/421 |
| 6,630,933 B1 | 10/2003 | Van Hook | |
| 6,636,212 B1 * | 10/2003 | Zhu | 345/421 |
| 6,636,215 B1 | 10/2003 | Greene | |
| 6,646,639 B1 | 11/2003 | Greene et al. | |
| 6,677,945 B2 | 1/2004 | Lapidous et al. | |
| 6,717,576 B1 * | 4/2004 | Duluk et al. | 345/419 |
| 6,720,964 B1 | 4/2004 | Fowler et al. | |
| 6,862,025 B2 | 3/2005 | Buehler | |
| 6,900,800 B2 | 5/2005 | Baldwin | |
| 6,924,801 B1 | 8/2005 | Dorbie | |
| 7,030,877 B1 * | 4/2006 | Sell | 345/422 |
| 7,091,971 B2 | 8/2006 | Morein | |
| 7,091,973 B1 | 8/2006 | Cohen | |
| 7,218,317 B2 | 5/2007 | Liao et al. | |
| 7,242,400 B2 | 7/2007 | Van Hook et al. | |
| 8,269,769 B1 | 9/2012 | Voorhies et al. | |
| 8,390,619 B1 | 3/2013 | Voorhies et al. | |

OTHER PUBLICATIONS

M. J. Aftosmis, "Solution Adaptive Cartesian Grid Methods for Aerodynamic Flows with Complex Geometries", Mar. 3, 1997, Lecture notes for 28th Computational Fluid Dynamics Lecture Series, von Karman Institute for Fluid Dynamics, pp. 88-96.*

Douglas A. Voorhies; Occlusion Prediction Compression System and Method; U.S. Appl. No. 10/745,160, filed Dec. 22, 2003.

Douglas A. Voorhies; Occlusion Prediction Compression System and Method; U.S. Appl. No. 10/745,277, filed Dec. 22, 2003.

Douglas A. Voorhies; Culling Data Selection System and Method; U.S. Appl. No. 11/303,351, filed Dec. 16, 2005.

M. Meibner, D. Bartz, and R. Gunther and W. Straber, "Visibility Driven Rasterization", 2001, Computer Graphics Forum, vol. 20 No. 4, p. 283-294.

Final Office Action; Mail Date Jul. 7, 2001; U.S. Appl. No. 11/539,608.

Advisory Action/Entered Amendment After Final Dated Sep. 21, 2011; U.S. Appl. No. 11/539,608.

Shanmugam, Perumaal et al. "Hardware Accelerated Ambient Occlusion Techniques on GPUs" Apr. 2007 ACM pp. 73-79.

Hegeman, Kyle et al. "Approximate Ambient Occlusion for Trees" Mar. 2006 ACM pp. 87-91.

Kontkanen, Janne et al. "Ambient Occlusion Fields" Apr. 2005 ACM pp. 41-47.

* cited by examiner

TIGHT DEPTH RANGE OCCLUSION PREDICTION SYSTEM AND METHOD

RELATED APPLICATIONS

This application is a continuation-in-part and claims the benefit of commonly-owned U.S. patent application Ser. No. 10/745,160, filed Dec. 22, 2003, now U.S. Pat. No. 8,390,619 entitled "AN OCCLUSION PREDICTION GRAPHICS PROCESSING SYSTEM AND METHOD" which is hereby incorporated by this reference. This application is a continuation-in-part and claims the benefit of commonly-owned U.S. patent application Ser. No. 10/745,277, filed Dec. 22, 2003, now U.S. Pat. No. 8,269,769 entitled "AN OCCLUSION PREDICTION COMPRESSION SYSTEM AND METHOD" which is hereby incorporated by this reference.

FIELD OF THE INVENTION

The present invention relates to the field of graphics processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results usually involve interfacing with a user and the interfacing often involves presenting graphical representation of images. Displaying graphics images usually requires intensive data processing which traditionally takes considerable time to process and often consumes significant power.

Computer graphics systems typically utilize a sequential stage or "pipeline" type process to map a three dimensional scene in the world coordinate system to a two dimensional projection (e.g., on a display screen). In most computer graphic systems an image is represented as a raster (an array) of logical picture elements (pixels). Pipelines typically assign parameter values to each pixel and the parameter values determine the nature of the projection on the display screen. The parameter values are digital values corresponding to certain attributes of the image (e.g. color, depth, etc.) measured over a small area of the image represented by a pixel. Typically each graphical image is represented by thousands of combined pixels. Providing information for each pixel is very data intensive and consumes a significant amount of processing resources.

There are a number of stages or processes included in a typical graphics pipeline. Various manipulations of pixel data are implemented at each stage in the pipeline. These manipulations often involve numerous computational processes that take a relatively long time to complete. In addition, the processing consumes significant power and can be a significant drain on limited power supplies, such as a battery. One process performed in a typical graphics pipeline is to eliminate pixel values that are occluded, such as values associated with "hidden" surfaces. The occlusion determining process typically occurs near or at the end of a graphics pipeline after a number of processing operations have been performed to establish a variety of pixel values. These processes are often performed even on pixel values that are eventually discarded at the end of the graphics pipeline.

The rate at which images are rendered in typical graphics systems is often critical to proper presentation of the information. Slow rendering rates often result in undesirable choppy or "jerky" presentations which usually results in a user experience that is non-immersive and unpleasant. The rate at which graphics systems can render images is often limited by the rate at which the processing devices can process the graphics information. However, users tend to have ever increasing demands for ever more spectacular and clearer images with better resolutions. Achieving better resolution often involves more graphic information processing and advanced applications. As more information associated with sophisticated applications and complex image rendering is fed into traditional graphics pipelines, the time required to process all the information increases since the graphics processing capabilities of the graphics systems typically have an upper limit. In addition, accessing the increased amounts of information also increases the time involved in retrieving the information from various memories. The increases in time to perform processing and information accesses typically slows the rendering rate and adversely impacts the graphics presentation.

SUMMARY

A graphics processing system and method for performing a tight depth range occlusion prediction are presented. Pixel values are removed from the pipeline based upon the results of the occlusion prediction, reducing the rendering work required and improving performance. Typically, pixel values may be removed if a depth value of a pixel is behind a previously-rendered depth value at a corresponding X,Y location. The tight depth range occlusion prediction performs this decision on a group of pixel values by predicting the range of depth values they lie within, and comparing that to the range of corresponding previously-rendered depth values. If the new and old ranges are disjoint and the new primitive's range is behind the previous drawing, pixel values in the group may be discarded. Continued graphics pipeline processing is performed on the remaining pixel values. Since tighter bounds on the depth values increase the chance that the ranges may be determined to be disjoint, the tight depth range occlusion prediction improves performance.

The range of depth values within the overlap of a convex polygon and a square or rectangular rasterization area can be determined by identifying whether the minimum and maximum depth values occur at the corners of the rasterization area or at intersections of the polygon's edges with the area's sides. By choosing between the prediction area corner and intersection for both the minimum and maximum depth limit, solving the depth plane equation at the chosen location, and clamping against the polygon's vertex depth range, a tight depth range describing the depth values within that overlap are obtained. That tight depth range is utilized to cull pixel values early in the pipeline, improving performance and power consumption.

In one embodiment, the tight depth range occlusion prediction determines prediction maximum and minimum depth values at an overlapping region vertex. In one exemplary implementation, an overlapping region vertex can correspond to a prediction area corner, a prediction area/primitive edge intersection or a primitive vertex. A corner analysis process is performed including examining depth slopes of the prediction area sides to ascertain a first corner with a maximum corner depth and second corner with a minimum corner depth. Outcodes are ascertained for the first corner and the second corner. In one exemplary implementation, a three bit outcode "000" means a prediction area vertex or corner depth value is within a drawn primitive. For example, first corner depth value is selected as the prediction maximum depth value if the out code for the first corner is a logical 000 value and the second corner depth value as the prediction minimum depth value if the outcode for the second corner is a logical 000 value. In one exemplary implementation, the depth plane equation is solved and then the depth range is clamped to the primitive's vertex depth gamut.

In one embodiment, the tight depth range occlusion prediction determines if the prediction maximum and minimum depth values are at an intersection of a prediction area side and an overlapping edge by performing an edge analysis process. In one exemplary implementation, the edge analysis process includes selecting an overlapping primitive edge to pursue; identifying which of the selected overlapping primitive edge intersections to choose; and determining on which of the prediction area sides the intersections lie. The tight depth range occlusion prediction can also include choosing an entry or exit side. An intersection coordinate of the overlapping region edge and a side of the prediction area are determined. For example, recursive subdivision is performed to determine the intersection coordinate of the overlapping region edge and a side of the prediction area

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1:
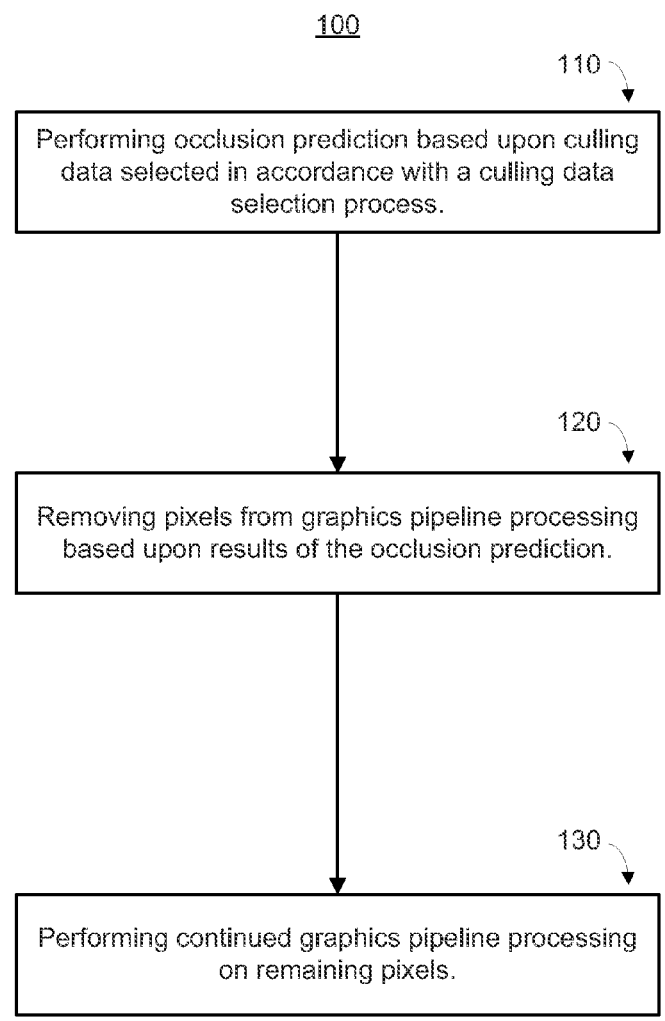
FIG. 1A is a flow chart of a graphics processing method in accordance with one embodiment of the present invention.
FIG. 1B is flow chart of an exemplary tight depth range selection process in accordance with one embodiment of the present invention.
FIG. 1C is a diagram of an exemplary prediction area and overlapping primitive in accordance with one embodiment of the present invention.
FIG. 1D is a diagram of an exemplary prediction area and one overlapping primitive edge in accordance with one embodiment of the present invention.
FIG. 1E is a diagram of an exemplary prediction area with multiple overlapping edges in accordance with one embodiment of the present invention.
FIG. 1F is an example of a prediction area with overlapping primitive edge exit and entry points highlighted in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

In one embodiment of the present invention, culling data is selected based upon an occlusion assessment metric and utilized in an occlusion prediction process. The occlusion assessment metric provides an indication of the probability that an image is "occluded" by the culling data and a pixel associated with the image can be eliminated early in a pipeline. In one embodiment, the occlusion volume is a portion of a viewing volume. A viewing volume is formed by a near plane closest to a perspective or "eye" (e.g., a closer Z value) and a farthest plane from a user's perspective or "eye" (e.g., a deeper Z value). References to near or nearer indicate a position within the view volume closer the user's perspective and far or farther indicate a position within the view volume a greater distance away from the user's perspective or "eye".

FIG. 1A is a flow chart of occlusion prediction graphics processing method 100 in accordance with one embodiment of the present invention. Occlusion prediction graphics processing method 100 facilitates efficient and effective utilization of processing resources. In one embodiment, occlusion prediction graphics processing method 100 is utilized to predict which pixel values are eventually occluded before intermediate processing stages are performed on the pixels. Pixel values are removed or discarded from the pipeline based upon occlusion prediction results and do not unnecessarily occupy processing resources. Remaining pixels are processed through the graphics processing pipeline.

In step 110, an occlusion prediction is performed based upon culling data selected in accordance with results of a culling data selection process which includes analysis of occlusion values received from a stage later in a graphics processing pipeline. The culling data assessment results include an occlusion assessment metric that provides an indication of the probability that an image is "occluded" by the culling data. In one embodiment, the culling data selection process includes determining possible occlusion volumes.

Receiving the "new" occlusion value from a stage later in the graphics processing pipeline that already performs frame buffer accesses for its own purposes, additional memory access bandwidth is not consumed reading an occlusion value (e.g., from a frame buffer). In one embodiment of the present invention, the occlusion information is received from a stage (e.g., a raster operation stage) in the graphics processing pipeline that initiates final reads and writes of occlusion information (e.g., to a Z buffer, frame buffer, etc.).

In one embodiment of the present invention, the occlusion prediction is based upon an occlusion value associated with pixels within a prediction area. A quantity and configuration of pixels within bounds of a prediction area are established (e.g., 2 by 4 pixel prediction area, 4 by 4 pixel prediction area, etc.). If analysis indicates that the pixels in the prediction area currently being rasterized are behind the culling data, the prediction is the pixels currently being rasterized should be culled.

In one exemplary implementation, the prediction area is a square or rectangle. For occlusion testing, the portion of the prediction area that overlaps the primitive (e.g., a triangle) being drawn is considered. The overlap is convex and permits the nearest depth value within the overlap region to be ascertained. Since depth varies linearly across the primitive the nearest depth value will be found at an overlapping region vertex. The overlapping region vertex can be a corner of the square or rectangular prediction area, or a primitive vertex (e.g., at a vertex of the original primitive), or at an intersection of a prediction area side with a primitive side. The nearest overlapping region vertex can be identified using the primitive's depth plane equation. If the nearest or closest overlapping region vertex has a depth value that is farther back or away from a user's eye, (e.g., has a deeper Z value) than an occlusion value (e.g., corresponding to the depth value bound on the already drawn pixels within the prediction area), a prediction is made that the primitive's depth values within the prediction area presently in raster stage are occluded by the corresponding pixel value in the depth buffer.

Figure 1B:
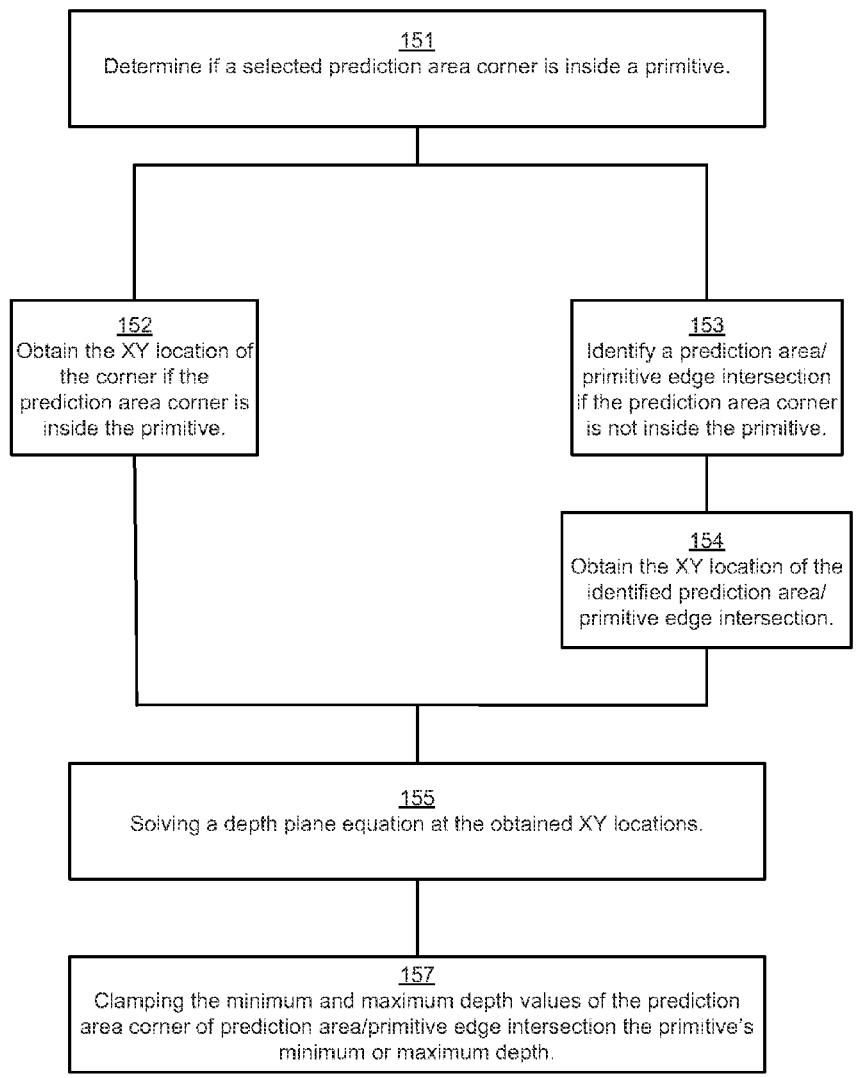

In one embodiment, occlusion prediction graphics processing method 100 includes a tight depth range occlusion prediction. FIG. 1B is a flow chart of a tight depth range selection process 150 in accordance with one embodiment of the present invention. Tight depth range selection process 150 identifies prediction maximum and minimum depth values. While exemplary implementations below are discussed in terms of prediction maximum depth value determination, it is appreciated the prediction minimum depth value is determined in an analogous (opposite) manner.

In step 151a determination is made if a selected prediction area corner is within a primitive. In one embodiment, outcodes are utilized in determining if a prediction area corner is within a primitive. In one exemplary implementation, a coarse rasterizer supplies "outcodes" for each corner of each prediction area (e.g., an 8×8 pixel block). A coarse rasterizer can also identify the prediction area triangles. An outcode includes bit fields corresponding to edges of an overlapping primitive. For example, an overlapping triangle primitive is associated with a 3 bit outcode, in which each bit field is associated with a respective edge of the overlapping triangle primitive. Each bit of the outcode is asserted if the corner of the prediction area is outside an edge of the overlapping primitive. For example, a prediction area corner with an outcode of 000 indicates the prediction area corner is inside an overlapping primitive triangle, whereas a prediction area corner outcode of 101 indicates the prediction area corner is outside edges "0" and "2" of the overlapping primitive triangle.

Figure 1C:
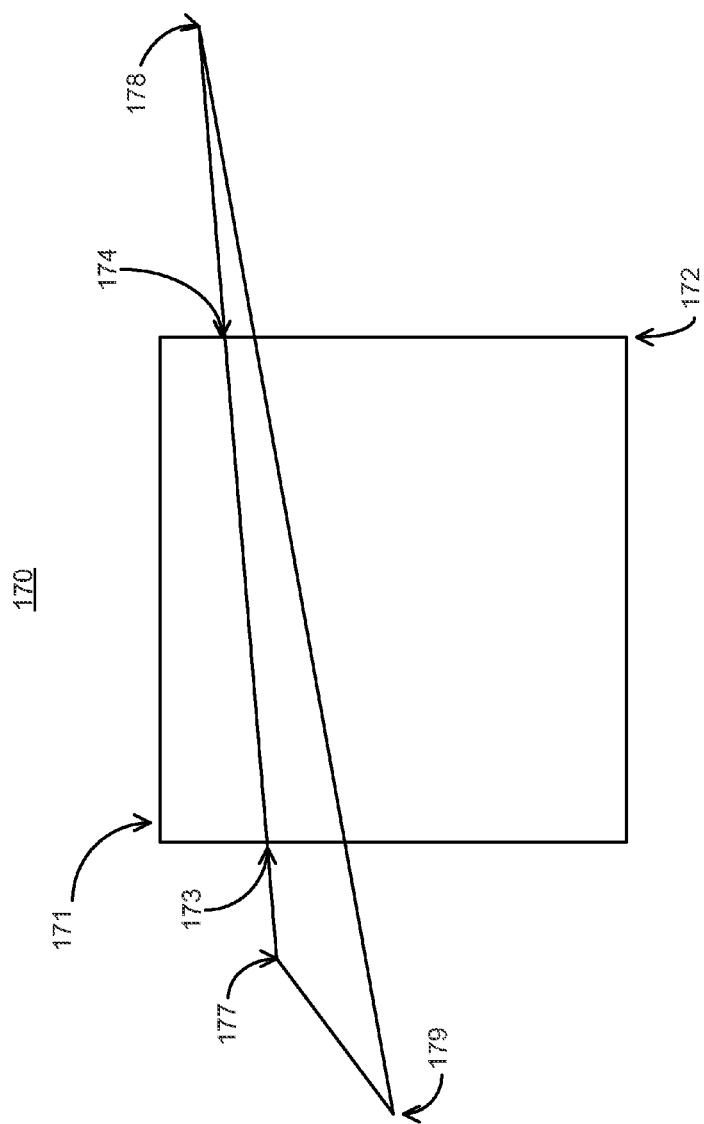

FIG. 1C is a diagram of an exemplary prediction area 170 and overlapping primitive (defined by vertices 177, 178 and 179) in accordance with one embodiment of the present invention. It is appreciated that while the present invention may be described in with reference to maximum depth value analysis, the present invention is similarly applicable to minimum depth value analysis. FIG. 1C shows a prediction area with no corners inside the primitive. It is appreciated that a corner can be included inside a primitive.

In step 152, the XY coordinate location of the predication area corner is obtained if the prediction area corner is inside the primitive. In one exemplary implementation, the process proceeds to step 155 after determining the XY coordinate location of the prediction area corner in side the primitive.

In step 153, a prediction area/primitive edge intersection is identified if the prediction area corner is not inside the primitive.

In step 154, the XY coordinate location of the identified predication area primitive edge intersection is obtained. In one exemplary implementation, the process proceeds to step 155 after determining the XY coordinate location of the prediction area corner in side the primitive In step 155 a depth plane equation is solved at an obtained XY location. The maximum depth Z value is at a prediction area corner (e.g., corner 171, 172, etc.) if the prediction area corner is inside an overlapping primitive and is the prediction area corner with the largest Z value. In one embodiment, the "largest Z" prediction area corner is determined by examining the sign bits of the depth Z slopes. In one exemplary implementation, the Z slopes are calculated by setup processes and passed down the pipe as part of a depth Z plane equation. For example, if both an X axis slope change (dZ/dX) and a Y axis slope change (dZ/dY) are positive, then Z increases in a plus X axis direction and in a plus Y axis direction and the maximum X maximum Y prediction area corner (in one exemplary situation a lower right corner) has the highest depth or Z value. The outcodes and the Z slope indication are utilized to determine if the lower maximum Z value is at the prediction area corners (e.g., 171, 172, etc.) or an intersection of a primitive edge and prediction area corner (e.g., 173, 174, etc.). In one exemplary overlapping triangle primitive implementation, the Z slope signs are used to identify a maximum Z prediction area corner and if the maximum Z prediction area corner outcode is 000, the Z value at the prediction area corner is utilized as the prediction maximum Z depth range value. If the maximum Z prediction area corner outcode is not 000, then the corner is outside of an overlapping triangle primitive edge. If the outcodes and the Z slope indicate the maximum is not at a prediction area corner the process proceeds with following steps to determine an overlapping primitive edge/prediction area side intersection (e.g., edge/side intersection 173, 174, etc).

Figure 1D:
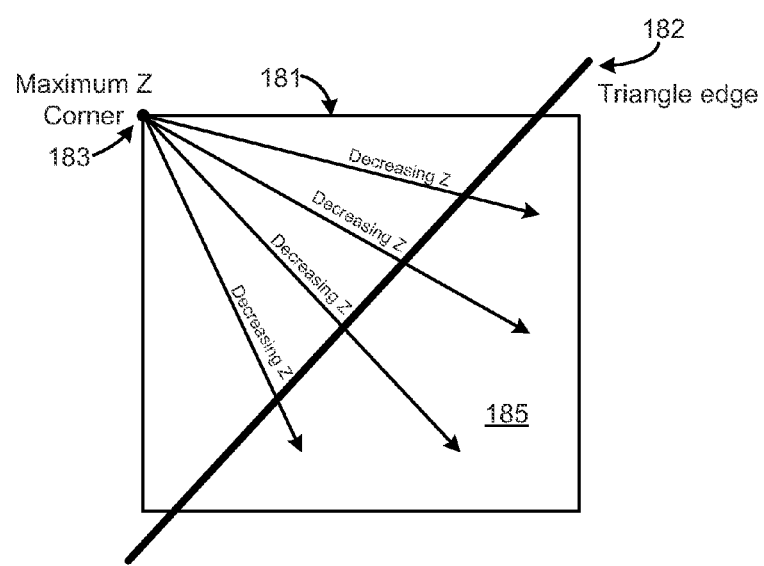

In one exemplary implementation, the maximum Z point of the overlapping primitive region lies on one of the primitive edges. When a triangle edge (182) separates triangle interior points (185) from the maximum Z corner (183) of the prediction area (181), all such interior points (185) must have a lower Z value than some point on that edge within the prediction area; thus the maximum Z value of the overlap area (185) must lie on that edge (182). FIG. 1D is a diagram of prediction area 181 and overlap region edge 182. The maximum Z corner of the area 185 above lies on the overlapping primitive edge. Since Z varies linearly, it is at one intersection or the other along the overlapping primitive edge, or at all points on the edge. If the overlapping primitive edge has a constant Z, the Z value will be correct if solved at any prediction Z point.

The present example assumes there is only one maximum Z prediction area corner (neither dZ/dX nor dZ/dY are zero), and that only one overlapping primitive edge crosses the prediction area. If one slope is zero, there are two maximum Z prediction area corners and the "decreasing Z" direction is vertical or horizontal. The overlapping primitive edge still lies between the overlap region and the maximum Z prediction area corners, and so the maximum overlap region Z again lies on the overlapping primitive edge.

Figure 1E:
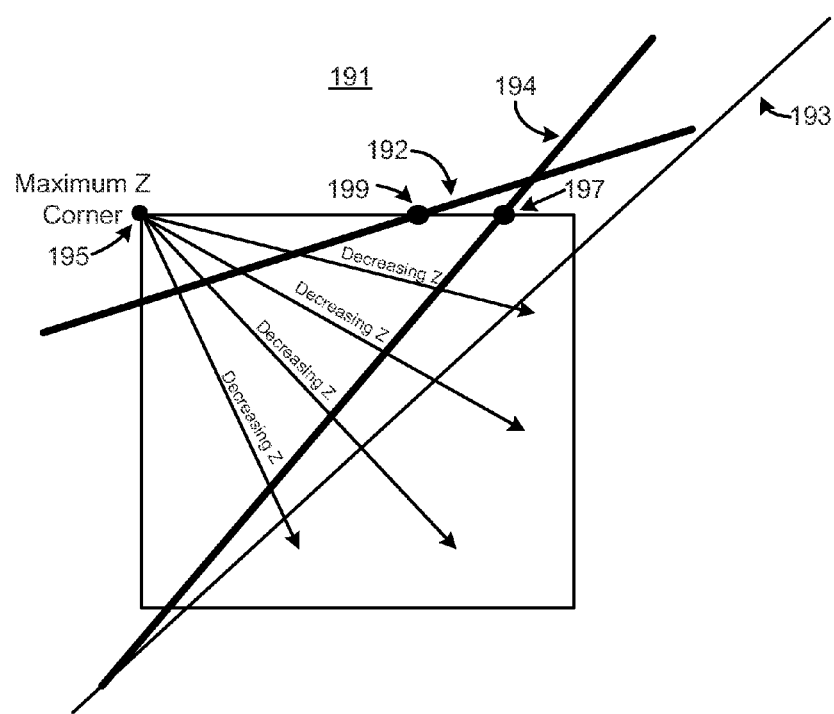

In one embodiment, there are multiple excluding overlapping primitive edges and some edges may not include the minimum or maximum depth values. If multiple overlapping primitive edges have asserted outcode bits at the maximum Z prediction area corner, it becomes more difficult to identify the maximum overlap region prediction Z point. In one embodiment, one of the overlapping primitive edges is selected and the remaining overlapping primitive edges are ignored. FIG. 1E is a block diagram of prediction area 191 with overlapping edges 192, 193 and 194. In one exemplary implementation, the lower-numbered edge 192 is selected. Selecting one overlapping primitive edge is safe because the overlapping primitive edges exclude regions within the prediction area. Thus, the two edges bound the Z values within the primitive. The overlap area's maximum Z lies on one of the four intersections of the two edges with the prediction area. Choosing the larger Z intersection of the "wrong" edge is safe because it will lie between the primitive and the maximum Z corner, and thus will be larger (more conservative) that the exact maximum Z point which lies on the other edge. As described earlier, if no overlapping primitive edges cross the prediction area, the maximum Z value lies at a prediction area corner (e.g., 195 in the present example). If one overlapping primitive edge excludes that prediction area corner, then the maximum Z lies at one of the overlapping prediction edge's intersection points.

If there is a second overlapping primitive edge that also excludes that prediction area corner, the actual maximum Z may or may not lie on a second overlapping primitive edge. If the actual maximum Z does not lie on the second overlapping primitive edge, ignoring the second overlapping primitive edge is harmless. If the actual maximum Z does lie on the second overlapping primitive edge, then the second overlapping primitive edge has further limited the overlap region's Z range, and computing a range using the first overlapping primitive edge will be conservative. In this case, the maximum Z point on the first overlapping primitive edge lies to the exterior side of the second overlapping primitive edge, and thus has a higher (more conservative) Z value. In the present example, the overlapping primitive edge chosen was the wrong one, it does not have the maximum overlap region Z (e.g., point 197) along the edge. Nonetheless, solving at point 199 is a tighter (lower maximum) Z than the 195 corner, and conservative (higher) than the exact value (at point 197).

In step 157, the minimum and maximum depth values of the predication area corner or predication area/primitive edge intersection are clamped to the primitive's minimum or maximum depth. In one embodiment "clamping" includes taking the maximum of the primitive minimum vertex Z and the corner/intersection minimum Z to obtain the final minimum Z, and taking the minimum of the maximum vertex and corner/intersection Z's to obtain the final maximum Z. Thus, the tighter of the limits is chosen. The corner and intersection depth range can be clamped to the primitive's minimum and maximum vertex depth range to further tighten the prediction area depth range.

A selection of the overlapping primitive side is made. Once an overlapping primitive edge is selected for pursuit, a choice of one of the intersections between a prediction area side and the selected overlapping primitive edge is identified. Which of the prediction area sides that intersection lies on is also identified. In the present example, there are 12 combinations of overlapping primitive edges and prediction area sides. Entering any one of four sides, it may exit through any of the remaining three, for a total of 12 combinations. The overlapping primitive edge may enter through any of the prediction area sides, and then exit through any of the remaining prediction area sides.

If an overlapping prediction edge crosses a prediction area side, the outcodes at the side's corners will have different values for that overlapping primitive edge's bit. Thus, outcodes 101 and 100 imply an overlapping primitive edge 0 (the 001 bit) crosses between those prediction area corners. Performing a logic XOR of the four pairs of adjacent prediction area corner outcodes. Selecting the bit corresponding to the selected edge, gives a 4-bit value with two asserted bits. These bits identify the two sides penetrated. Choosing between the two sides requires knowledge of the edge's orientation and whether Z increases or decreases along it.

The edge's orientation can be obtained from the sign bits of the edge's edge equation slopes. For example, an edge for which the triangle interior lies to the +X, +Y direction (e.g., down and to the right) is oriented between "southwest" and "northeast". Examining whether the overlapping primitive is clockwise or counterclockwise, the overlapping primitive edge's general direction can be determined. A clockwise overlapping primitive would have the edge go from southwest up and to the right towards northeast. A counter-clockwise overlapping primitive would have an edge go the other way if the interior is down and to the right. Thus, the edge equation slope sign bits, plus the clockwise/counterclockwise bit, together uniquely identifying the edge's direction as a quadrant. In one exemplary implementation, the quadrant can be specified by 2 bits.

Knowing the edge's general direction (e.g., as a quadrant) permits a selection between the prediction area sides previously determined are intersected using the outcodes. For example, if the top and bottom prediction area sides were the ones crossed, and the overlapping primitive edge's direction is up and to the right, the overlapping primitive edge enters through the bottom and exits through the top. The 2-bit quadrant and the 4-bit penetrated-sides can identify which of the 12 combinations of overlapping primitive edges apply. For example, which of the two penetrated side intersections with the selected edge has the maximum depth value can be identified.

A determination is made if a prediction area side is an entry or exit side. Which overlapping primitive edge and which prediction area sides were the entry and exit are known and an intersection is chosen. In one embodiment, information from setup operations is utilized to make the choice. In one exemplary implementation, setup operations subtract the primitive vertex Z values, and pass down the sign of those subtractions. These bits denote the "Z direction" and indicates if Z increases or decreases going from one overlapping region vertex to the next. To find the maximum Z intersection, if the Z direction is increasing, the "exit" side is chosen. If the Z direction is decreasing, the "entry" side is chosen.

Figure 1F:
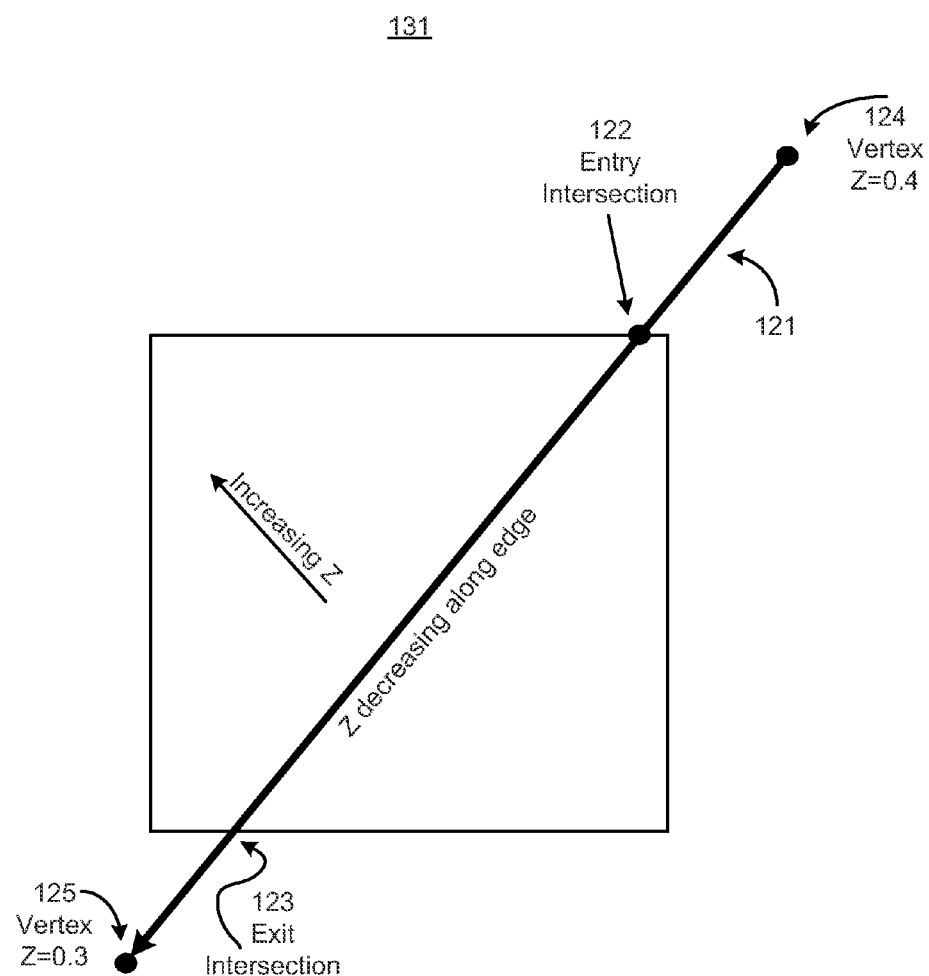

FIG. 1F is an example of a prediction area 131 with overlapping primitive edge exit and entry points in accordance with one embodiment of the present invention. Edge 121 is oriented towards the lower left from primitive vertex 124 to primitive vertex 125, and Z decreases along the edge (from 0.4 to 0.3). As a result, the "entry" intersection 122 has higher Z than the "exit" intersection 123. Since edge 121 penetrates the top and bottom sides of the prediction area 131, the maximum Z can be found at overlapping primitive edge "entry" intersection 122 with the top side of the prediction area.

At this point, a tight depth range or "Z-per-sliver" algorithm has identified where it can solve for the maximum Z not as an X,Y location, but as the intersection of two lines. In one embodiment, division is utilized to find the line intersection. The tight depth range algorithm is implemented twice (min and max) for each prediction area that is handled in parallel (e.g. eight times), to find the minimum and maximum Z for each of four prediction areas per clock. The X,Y location of the identified intersection is needed before the Z value can be obtained.

In one embodiment, recursive subdivision is utilized to find the intersection location while avoiding the use of dedicated division logic hardware. Since a depth value for culling occluded images (e.g., "Z cull") is located between a Coarse Raster and a Fine Raster, the full-precision edge equations are available. These consist of a 42-bit integer "solution" for each edge equation (at the upper left corner of the 1 6×16 to which an 8×8 belongs), plus two dE/dX, dE/dY slopes. The two dE/dX, dE/dY slopes indicate how much the edge equation value changes for each ¼ th pixel step in a +X and +Y direction. Using multiples of these slope values can move the edge solution to any corner of any prediction area (e.g., in a 8×8 region, 16×16 region, etc.). This is done for both ends of the prediction area side involved in each intersection calculation.

The outcode bits provided by Coarse Raster are the sign bits of the overlapping primitive edge equations at the prediction area corners. Since the outcode bits differ at the prediction area corners of a side crossed by an overlapping primitive edge, the edge equation solutions at those corners have different signs. Since edge equations are linear, there is a point between those prediction area corners at which the edge equation evaluates to zero. By definition, that point is on both the prediction area side and the overlapping primitive's edge. In other words, one end corner of a penetrated side is negative and the other is positive, since a side being crossed by an edge implies on corner is to the outside of the at edge and the other is to the inside.

In binary recursive subdivision, the positive and negative edge solutions are arranged at two prediction area corners to determine the edge solution at the midpoint. If the solution is negative, subdivide the half-side between the midpoint and the positive corner. This subdivision is repeated pursuit of the half-range that has different signs at its ends. The endpoint values are averaged to produce the midpoint value. With each iteration, the intersection location is refined to have twice the precision, denoting which half, quarter, eighth, etc. of the original side contains the zero-crossing. After 8 iterations, the location to within $\frac{1}{32}$ of a pixel ($\frac{1}{256}$ of a prediction area side) is ascertained.

In one embodiment, to shorten the tight depth range pipeline, four-way subdivision is performed, chopping each range into four sub-ranges with each iteration. In one embodiment, where the prediction area is an 8×8 pixel square, 8 iterations subdivides the side ton one part in 256, determining the intersection location on an 8-pixel side to $\frac{1}{32}$ nd of a pixel. After four iterations, the location is known to within $\frac{1}{32}$nd of a pixel. Four-way subdivision evaluates the ¼, ½, and ¾ points along a range, and pursues the subdivision range whose endpoints have different signs. Thus, each four-way iteration accomplishes the same work as two binary recursive subdivision iterations.

Knowing which prediction area side, and an 8-bit fractional distance along that prediction area side, is sufficient to obtain an X,Y location. In one embodiment, one coordinate is known exactly and one is known to $\frac{1}{32}$ of a pixel, and is rounded conservatively. Whether that means rounding up or down would appear at first to be complicated since a decision is affected by the prediction area side's orientation and the Z direction, and whether the minimum or maximum is sought. However, it is sufficient to round towards the negative edge corner or select the end of the final quarter-range with the negative edge equation. That makes the chosen location slightly outside the primitive (e.g., triangle) and conservative. Being just outside an excluding overlapping primitive edge has slightly higher Z than the edge if the edge excludes the maximum Z corner, and vice versa.

The Z Plane Equation is solved. Once an X,Y location is determined, the Z plane equation is solved at that point. Having solved the Z plane equation at one corner of the prediction area as part of rasterization, obtaining the Z plane equation solution at another corner or intersection involves merely moving over a few pixels (e.g., 0-8 pixels along an X axis direction and 0-8 pixels along a Y axis direction). In one embodiment a 3-D dot product is used to evaluate:

$$Z = Z\text{center\_of\_16} \times 16 + X\text{distance} * dZ/dX + Y\text{distance} dZ/DY.$$

Since a 3_D dot product does AX+BY+CZ, two multiplies are performed and "C" is set to 1.0. In one embodiment, a 3-D dot product is calculated using a "S.8.18" 27-bit floating point format. The X and Y "move distances" are converted to that format, as is the initial corner Z solution, which had previously been S.8.26, and the dZ/dX and dZ/dY slope terms, which were originally S.8.23.

The S.8.18 Z solution is converted to a 16-bit integer by first isolating the upper 16 bits (sign, exponent, and 7 mantissa bits). That intermediate 16 bit value is not monotonic; that is, larger integer values do not always imply larger Z values, because the upper bit corresponds to the original sign bit, which is asserted for negative numbers. Inverting the upper bit makes negative numbers be smaller integers, and inverting the remaining bits if the original sign bit was asserted makes more-negative numbers be smaller integers than less-negative numbers. The result is a 16-bit integer that monotonically encodes the Z plane equation solution.

The output of tight depth range is a 16-bit "internal format" Z value, plus three other bits. A "valid" bit is usually on, but will be off if the Z plane equation is not finite. For example, the valid bit is off if a coefficient of the Z plane equation (e.g., Z solution at a corner, either slope, etc.) is infinite or if the final Z solution is infinite (e.g., beyond what can be represented). The "underrange" and "overrange" bits encode out of range Z values when the Z-buffer is a 24-bit integer encoding 0.0-1.0 as 0X000000 to 0Xffffff. Underrange expresses that the Z solution was less than 0.0, overrange expresses greater than 1.0. Having the underrange and overrange bits is useful in clipping to the near or far planes; they can express that the prediction area was completely below 0.0 or above 1.0.

In step 120, pixel values are removed from the pipeline based upon the occlusion prediction results. In one exemplary implementation, the pixel values which the prediction indicates will be occluded are removed from the pipeline (e.g., discarded) before occupying intermediate graphics processing pipeline resources (e.g., shading system resources) and performing processing on the predicted occluded pixel values. Processing time is not consumed on pixel values that are not seen. Since pixel values that are occluded and not seen by the user are discarded at the end of the pipeline anyway, they are culled before intermediate processing is performed on them. In one embodiment, a pixel associated with X,Y position corresponding to the culling data is removed from the pipeline if the pixel Z value is behind culling data Z values. In one exemplary implementation, the minimum/maximum Z range produced by two Z-per-sliver algorithm calculations is clamped to the primitive's Z gamut.

In step 130, continued graphics pipeline processing is performed on remaining pixel values. In one embodiment, shading processing is performed upon the remaining pixels. The remaining pixels are also subjected to full occlusion processing in a final occlusion analysis stage (e.g., Z buffer processing) and pixel values that were not culled earlier but are occluded are discarded during the final occlusion analysis stage.

In one embodiment of the present invention, stencil occlusion processing results are also predicted in step 110. For example, pixel values presently in the rasterizing stage of a graphics processing pipeline are examined for potential stencil processing and a prediction regarding the stencil processing is made. In one exemplary implementation, the stencil processing prediction includes maintaining an array of stencil occluder bits that denote pixel regions whose stencil values fail a predetermined stencil comparison. If the currently active stencil comparison matches the predetermined comparison, these stencil occluder bits can be used to cull (discard) pixels before subsequent shading and other processing.

It is appreciated that the present invention can be implemented in a variety of embodiments. In one exemplary implementation, the present invention can be utilized in processing systems that support a variety of graphics applications including video games. For example, the present invention can be utilized in graphics rendering processes of a game console, personal computer, personal digital assistant, cell phone or any number of platforms for implementing a video game. It is also appreciated that references to video game application implementations are exemplary and the present invention is not limited to these implementations.

Figure 2:
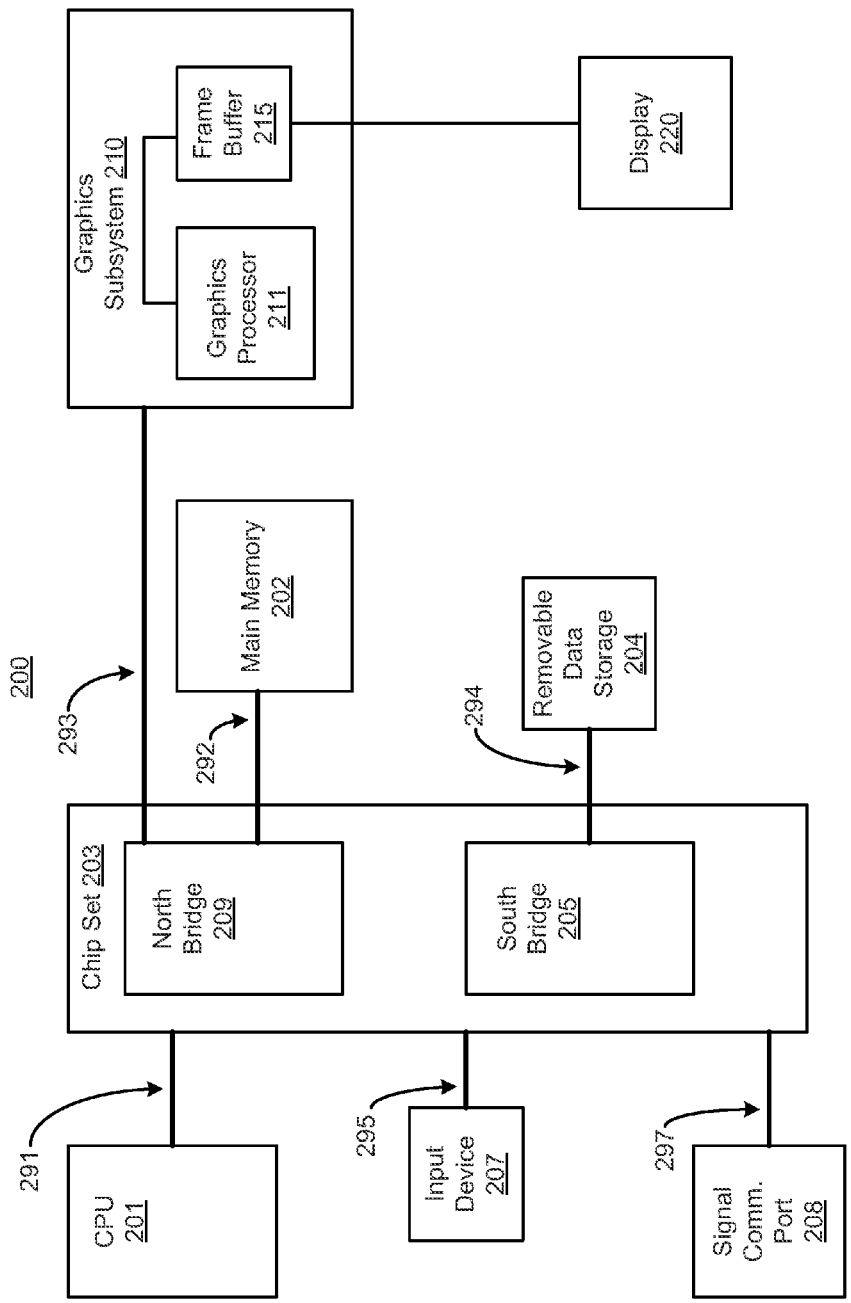
FIG. 2 is a block diagram of a computer system in accordance with one embodiment of the present invention.

FIG. 2 is a block diagram of a computer system 200, one embodiment of a computer system upon which embodiments of the present invention can be implemented. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 293 couples north bridge of chipset 203 to graphic subsystem 210. Communication buses 294-297 (e.g., a PCI bus) couple south bridge 205 of chip set 203 to removable data storage device 204, input device 207, and signal communications port 208 respectively. Graphics subsystem 210 includes graphics processor 211 and graphics buffer 215.

The components of computer system 200 cooperatively operate to provide presentations of graphics images. Communications bus 291 through 297 communicate information. Central processor 201 processes information. Main memory 202 stores information and instructions for the central processor 201. Removable data storage device 204 also stores information and instructions (e.g., functioning as a large information reservoir). Input device 207 provides a mechanism for inputting information and/or for pointing to or highlighting information on display 220. Signal communication port 208 provides a communication interface to exterior devices (e.g., an interface with a network). Display device 209 displays information in accordance with data stored in frame buffer 215. Graphics processor 211 processes graphics commands from central processor 201 and provides the resulting data to graphics buffer 215 for storage and retrieval by display monitor 220.

In one embodiment of the present invention, graphics processor 211 processes information, including graphics information (e.g., information associated with graphics processing method 100). Graphics processor 211 processes the graphics information in a pipeline sequence and performs culling during a rasterization stage of the pipeline. Graphics processor 211 can compare pre-cull values to end of graphics processing pipeline values (e.g., post occlusion determination values) to analyze if pre-cull pixel values should be culled. In one embodiment of the present invention, the cull values are associated with a prediction area. The end of graphics processing pipeline values can also be stored in an on chip register for utilization in future occlusion predictions.

Figure 3:
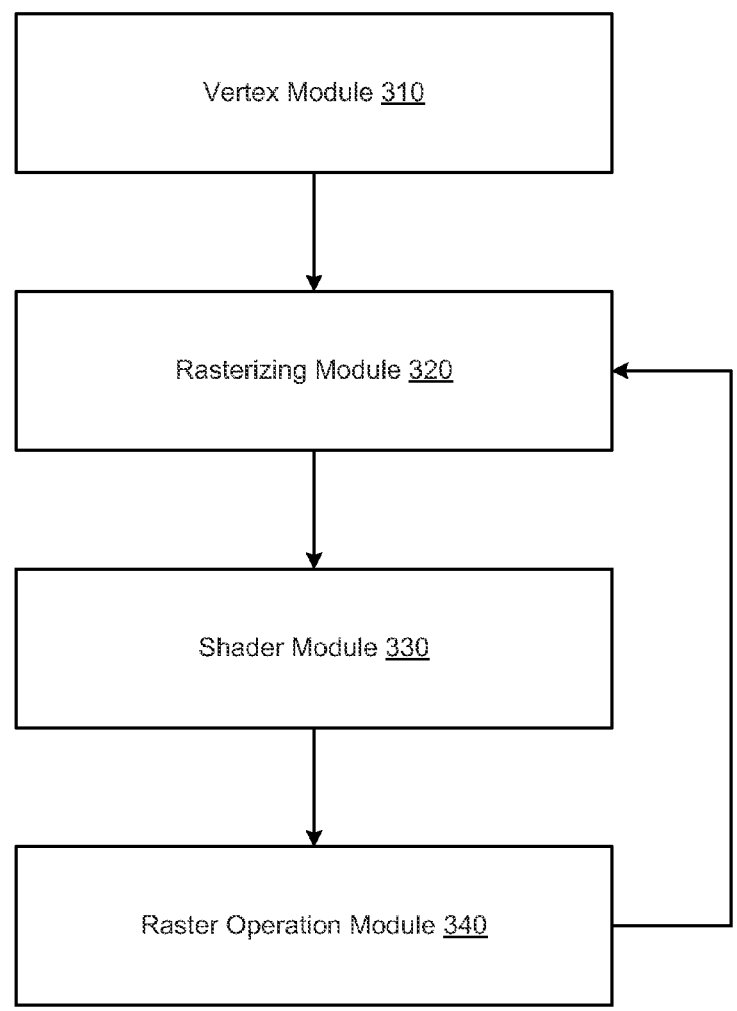
FIG. 3 is a block diagram of a graphics pipeline in accordance with one embodiment of the present invention.

FIG. 3 is a block diagram of graphics processing pipeline 300 in accordance with one embodiment of the present invention. Graphics processing pipeline 300 (e.g., a pixel processing pipeline) comprises pipeline vertex module 310, rasterizing module 320, shader module 330, and raster operation module 340. Vertex module 310, rasterizing module 320, shader module 330, and raster operation module 340 are serially communicatively coupled to one another. Raster operation module 340 is also communicatively coupled to rasterizing module 320. In one embodiment, graphics processing pipeline 300 is similar to a pipeline process utilized in computer system 200.

The components of graphics processing pipeline 300 cooperatively operate to perform graphics pipeline operations. Vertex module 310 determines vertices information and forwards the resulting information to rasterizing module 320. Rasterizing module 320 rasterizes pixels including performing culling based upon prediction results. In one exemplary implementation, rasterizing module 320 determines coordinate values (e.g., identifies X, Y and Z coordinate values) of the respectively received graphics pipeline pixel information and forwards graphics pipeline information to shader module 330. Shader module 330 performs pixel shading calculations on the pixel information and forwards the results to raster operation (ROP) component 340. Raster operation (ROP) component 340 performs final processing on pixel values (e.g., occlusion and stencil processing) and writes appropriate values to a frame buffer (not shown). For example, ROP component 340 reads "old" Z values from a Z buffer, compares the "old" Z values to corresponding current Z values and writes the corresponding current Z values to the Z buffer if the current Z values are nearer than the old Z values. ROP component 340 also forwards the farthest Z value in a prediction area to rasterizing module 320. In one embodiment, ROP component 340 also performs stencil operations and tests stencil values as they are read and/or written to determine if a pixel value update would be rejected. The results for a prediction area are aggregated similar to Z values by recording (e.g., asserting a corresponding bit in a stencil mask) if pixels within the prediction area would cause rejection.

In one exemplary implementation, rasterizing module 320 performs the rasterizing in a coarse rasterization stage and a fine rasterization stage. The occlusion culling can be performed after the coarse stage and before the fine stage and reduce precise pixel rasterization work of the fine stage performed on pixel values that are eventually discarded. This permits pixel values to be discarded at a rate faster than the fine rasterizer operates. Rasterizing module 320 establishes which pre-culled values are associated with pixels within bounds of a prediction area and which overlapping region vertex of the prediction area is closest or nearest. Rasterizer module 320 compares the closest pre-culled overlapping region vertex value to a corresponding occlusion value. In one embodiment, the corresponding occlusion value is received from raster operation module 340 at the end of graphics processing pipeline 300. If the present closest pre-culled overlapping region vertex value is behind the corresponding occlusion value, the present group of pixel values associated with the prediction area are culled (e.g., discarded) by rasterizer module 330 and not forwarded to the remaining modules for processing. In one embodiment, values received from ROP 340 are "outdated" and the Z values change monotonically closer to the eye. In one exemplary implementation, if the Z values change non-monotonically the culling operations can be suspended until the start of the next frame. In one embodiment, values from ROP 304 are selected and stored before a comparison is performed.

Figure 4:
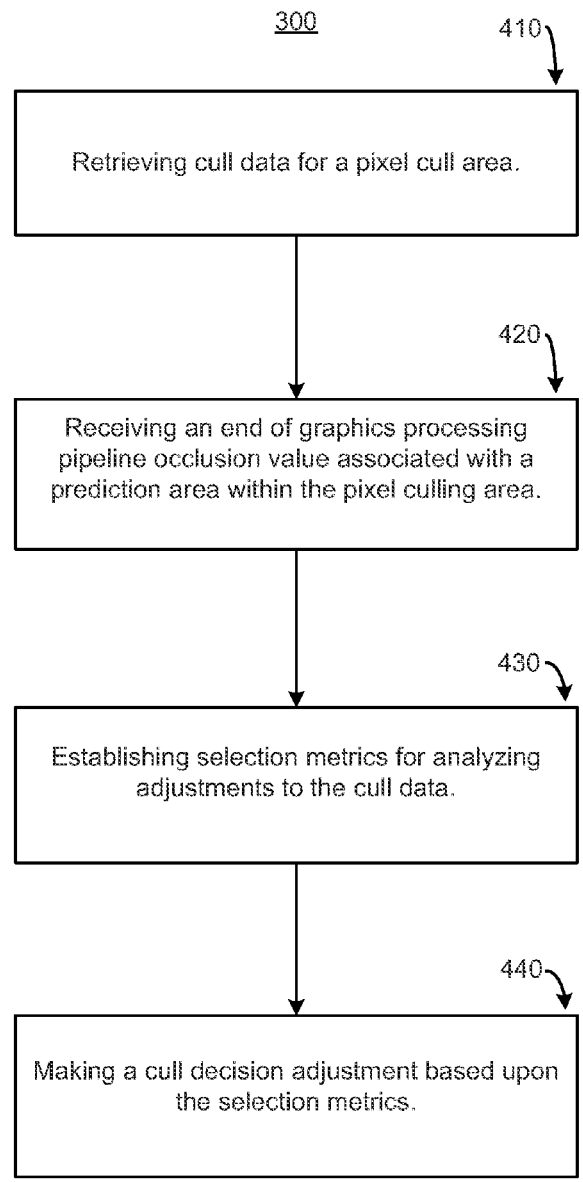
FIG. 4 is a flow chart of an exemplary pixel cull data method in accordance with one embodiment of the present invention.

In one embodiment of the present invention, occlusion prediction information is compressed. FIG. 4 is a flow chart of pixel cull value compression selection method 400 in accordance with one embodiment of the present invention. In one embodiment, the cull Z value and an associated mask are stored in an on chip memory (e.g., random access memory, cache, etc.). The mask denotes fully occluded pixels at the corresponding cull value or in front of the cull value. The mask is stored in a memory word with the cull value. In one embodiment of the present invention, pixel cull value compression method 400 is used to compress occlusion prediction values utilized in occlusion prediction graphics processing method 100.

In step 410, cull data associated with a pixel culling area (e.g., a 16 by 16 pixel area, 8×8 pixel area, 4×8 pixel area, etc.) is retrieved. In one embodiment, the cull data is retrieved from an on chip memory location (e.g., RAM, cache, etc.). Cull data can be initialized to have "no occluders" (e.g., mask=0). In one exemplary implementation, initial cull data is established based upon the farthest plane on a depth axis of a viewing volume. In another exemplary implementation, the initial cull value is the farthest representable depth threshold value of an occluding volume.

In step 420, an end of graphics processing pipeline occlusion data associated with a prediction area within the pixel culling area is received. In one embodiment, an end of graphics processing pipeline occlusion data is received from a raster operation (ROP) component at the end of a graphics processing pipeline. In one embodiment, the culling data and end of graphics processing pipeline occlusion data include aggregated pixel information. The aggregation includes establishing the farthest occlusion value. A mask (e.g., a depth or Z value mask, a stencil mask, etc.) is also produced as part of the aggregation. The mask denotes which prediction areas within the culling area have end of graphics processing pipeline Z values at or nearer than the Z value associated with the mask.

In one embodiment of the present invention, the mask includes occlusion indications for each prediction area within a culling region. For example, a depth or Z value mask indicates which pixels values in a particular culling area are equal to or in front of a Z cull value associated with the mask. In one embodiment, each bit in a mask is associated with a bounded pixel area permitting significant compression. For example, storing a cull Z value and a mask in which each bit represents a 4 by 2 prediction area permits 139 to 1 compression in one exemplary implementation. In one exemplary implementation the cull Z value and mask are stored in a 44 bit word on chip memory word associated with a 16 by 16 pixel cull area or region. The 44 bit memory word comprises a 12 bit cull Z value and 32 bit mask in which each bit represents a 4 by 2 pixel prediction area. In a Z buffer the 16 by 16 cull area Z information is represented by 6,144 bits (16 pixels times 16 pixels times 24 bits). In one embodiment, a mask denotes areas with Z that is nearer than the associated Z value and the mask bit is asserted if the corresponding area is fully covered by the updates from the ROP.

In step 430, selection metrics are established for analyzing adjustments to the cull data. In one embodiment, establishing selection metrics includes determining the volume behind the current cull value, a present retrieved end of graphics processing pipeline occlusion value and a merged configuration value respectively. The volume is determined by multiplying the respective XY indications by the respective Z depths. In one embodiment, the cull data and occlusion data include a respective single farthest Z limit value and a respective mask denoting which pixel blocks are known to be one side of the farthest Z limit. In one exemplary implementation, the respective occlusion volume is the respective "distance to a far plane" (e.g., the Z difference between a Z limit and the far Z plane) multiplied by the respective XY information (e.g., respective XY area, number of asserted bits in a respective mask, etc).

In one embodiment, the selection metrics are weighted to compensate for crowding. For example, since Z values tend to be crowded at the far plane when doing perspective from the eye. The Z values can be weighted more or biased to account for closeness to the far plane since the first little distance from the far plane is "more" valuable in terms of occluded pixels than a corresponding distance closer to the eye. In one embodiment, weighting is performed in accordance with a current application. For example, the pipeline settings can be analyzed to determine if an application is a perspective or orthographic application and weighting is turned on for the perspective application. In one exemplary implementation, the Z values are represented in floating point and just looking at the upper bits of the exponent tends to be a logarithmic weighting in the correct direction.

In step 440, a cull data adjustment is made to include new occlusion values as guided by the selection metrics. The cull data is updated in accordance with the decision and stored in the random access memory and/or an on chip memory. In one embodiment, a cull adjustment decision is based upon three possible options. The current cull data (e.g., current cull Z value and corresponding mask) is maintained or unchanged if the selection metric for the current cull value is highest (e.g., the volume is the greatest). The current cull data is changed to the present retrieved end of graphics pipeline occlusion value and corresponding mask if the selection metric for the present retrieved occlusion value is highest. Current cull data is changed to merged data if the selection metric for the merged value is highest. The merged data includes the farthest Z limit value of the current cull data and the present retrieved end of graphics pipeline occlusion data. The merged data also includes logically OR-ing the current cull mask bits and present retrieved end of graphics pipeline occlusion data.

In one embodiment, additional multiplicative or additive adjustments can be made to selection metrics to compensate for a variety of conditions. For example, the merged data can be given additional weight in the case of a "tie" (e.g., the merge volume and another volume are the same or close). In one exemplary implementation, the merge data is selected if there is a non-monotonic operation (e.g., a clear operation in which Z value is pushed back) as opposed to a monotonic operation (e.g., one that gets monotonically closer to the eye).

Figure 5:
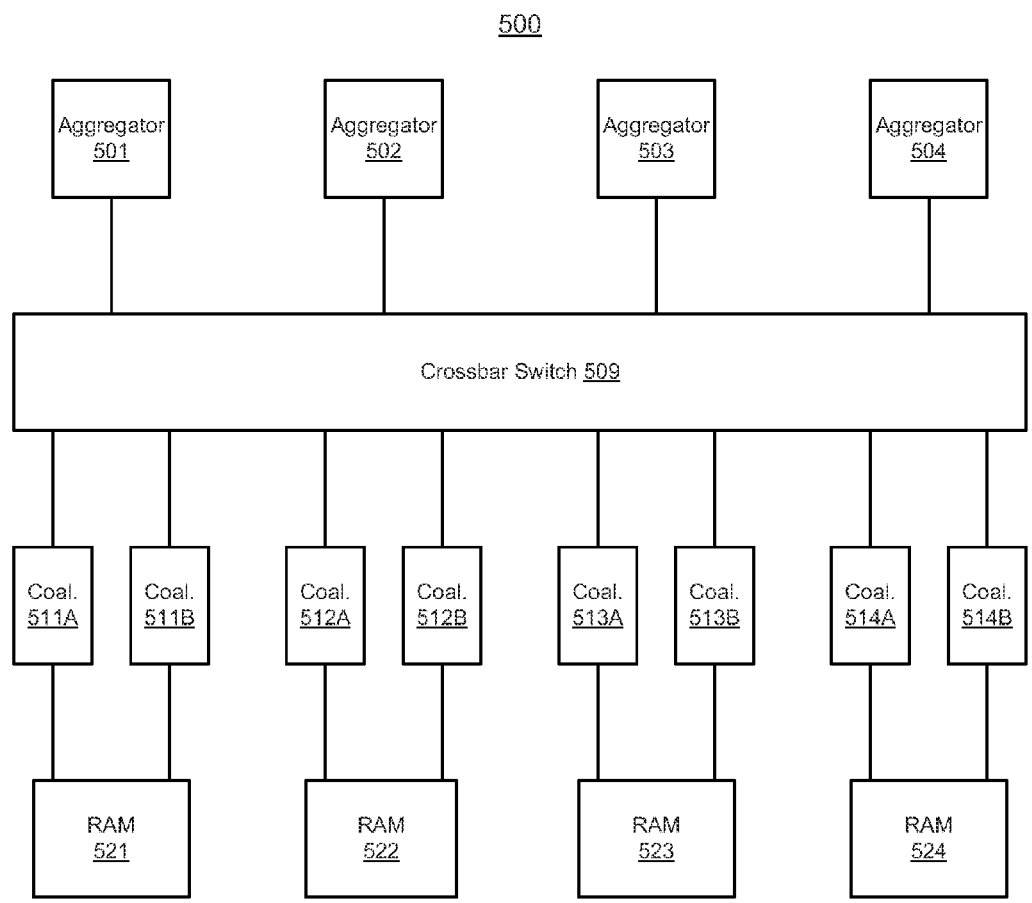
FIG. 5 is a block diagram of a pixel cull value compression system in accordance with one embodiment of the present invention.

FIG. 5 is a block diagram of pixel cull value compression system 500 in accordance with one embodiment of the present invention. Pixel cull value compression system 500 includes aggregators 501 through 504, crossbar switch 509, coalesce components 511A through 514B, and random access memories (RAMs) 521 through 524. Aggregators 501 through 504 are coupled to crossbar switch 509 which is coupled to coalesce components 511A through 514B. Coalesce components 511A and B are coupled to RAM 521. Coalesce components 512A and B are coupled to RAM 522. Coalesce components 513 A and B are coupled to RAM 523. Coalesce components 514A and B are coupled to RAM 524.

The components of pixel cull value compression system 500 cooperatively operate to compress pixel cull value information. Aggregators 501 through 504 aggregate end of pipe depth value information associated with a bounded pixel area. In one exemplary implementation, aggregators 501 through 504 aggregate end of graphics processing pipeline values received in step 420. Crossbar switch 509 interleaves information associated with a plurality of the bounded pixel areas in a tiled manner. Crossbar switch 509 also balances information associated with the plurality of bounded pixel areas across the plurality of memories 521 through 524. Coalesce components 511A through 514B coalesce depth value information for a plurality of the bounded pixel areas located in adjacent proximity in a presentation plane and replace the updated base cull depth information. In one embodiment, the base cull depth value is selected based upon present invention selection metrics. In one exemplary implementation, establishing selection metrics includes determining the volume behind the current cull value, a present retrieved end of graphics processing pipeline occlusion value and a merged configuration value volume. After establishing the selection metrics, the mask and depth value corresponding to the largest volume is chosen as the cull depth value. For the "old" the old Z and mask are selected, for the "new" the new Z and mask are selected, and for the "merged" the mask is the OR of the "old" and "new" mask and the farther of the old and new Z values. In one exemplary implementation, coalesce buffers 511A through 514B segment a view volume into regions based upon offsets from the cull value (e.g., similar to step 430), and determine adjustments to the cull value and cull masks (e.g., similar to step 440).

In one embodiment, coalesce components 511A through 511B include an accumulation register that stores occluder packets as a determination is made to store the occlusion information from an end of graphics processing pipeline stage (e.g., raster operation module 340) in a compressed form. In one embodiment of the present invention, the coalesce components 511A through 511B perform segmentation into regions based upon offset from the cull value (e.g., perform step 430). As packets associated with other culling areas begin to arrive and accumulation registers are occupied the current accumulation of information gets displaced and written to on chip memory (e.g., a RAM, cache, etc.). Random access memories 521 through 524 comprise a plurality of memory sub-components and store updated base cull depth information.

Thus, the present invention facilitates optimized utilization of processing resources and conservation of time. Intermediate graphics pipeline stage processing of pixels that are eventually occluded is reduced. By efficiently and effectively utilizing processing resources, end result graphics images processing rate is increased and faster rendering is provided. The present invention also facilitates rate increases because pixels can be culled or rejected faster than they are processed. For example, pixels can be rejected at four times the fastest processing rate and in a frame where 25% of the pixels are culled the overall increase is 23%. In addition, the present invention does not consume additional bandwidth accessing a frame buffer to obtain actual Z or stencil values and updating a compressed representation. The present invention also provides an efficient comparison mechanism without comparing a primitive's (e.g., triangle) full Z range against an occluder Z. The present invention also facilitates conservation of power by not expending energy on intermediate processing for pixels that are eventually discarded.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A graphics processing method comprising:
    performing a tight depth range occlusion prediction process after a coarse rasterization stage and before a fine rasterization stage in which a range of depth values for a group of pixels is predicted before complete rendering of the pixels based upon a position and depth of a primitive;
    removing pixel values from the pipeline based upon results of the occlusion prediction;
    suspending said removing until a next frame if a depth value associated with said occlusion value change non-monotonically; and
    performing continued graphics pipeline processing on remaining pixel values for utilization in graphics rendering.

2. A graphics processing method of claim 1 wherein the tight depth range occlusion prediction process determines if prediction maximum and minimum depth values correspond to depth values at a corner of the prediction area within a primitive, overlapping prediction area/primitive edge intersection or primitive vertex.

3. A graphics processing method of claim 2 wherein the tight depth range occlusion prediction process comprises:

obtaining an XY coordinate location of said prediction area corner if said selected prediction area corner is inside said primitive;

identifying a prediction area/primitive edge intersection if said prediction area corner is not inside said primitive;

obtaining an XY coordinate location of said identified prediction area/primitive edge intersection;

solving said depth plane equation at said obtained XY locations; and clamping minimum and maximum depth values of said prediction area corner or said prediction area/primitive edge intersection to a primitive's minimum or maximum depth.

4. A graphics processing method of claim 3 wherein said clamping includes taking a maximum of a primitive minimum vertex depth value and a corner/intersection minimum depth value to obtain a final minimum depth value; and taking a minimum of a maximum vertex and corner/intersection depth values to obtain the final maximum depth value.

5. A graphics processing method of claim 3 wherein the tight depth range occlusion prediction process further comprises:

selecting an overlapping primitive edge to pursue;

identifying which of the selected overlapping primitive edge intersections to choose; and determining on which of the prediction area sides the intersections lie.

6. A graphics processing method of claim 5 wherein the tight depth range occlusion prediction further comprises choosing an entry or exit side.

7. A graphics processing method of claim 6 wherein the tight depth range occlusion prediction process further comprises determining an intersection coordinate of the overlapping region edge and a side of the prediction area.

8. A graphics processing method of claim 6 wherein the tight depth range occlusion prediction process further comprises performing recursive subdivision to determine the intersection coordinate of the overlapping region edge and a side of the prediction area.

9. A graphics processing method of claim 5 wherein the tight depth range occlusion prediction further comprises solving a depth plane equation.

10. A graphics processing method of claim 3 wherein a Z value at said selected prediction area corner is utilized as a prediction maximum Z depth range value if a maximum Z prediction area corner outcode is 000.

11. A graphics processing system comprising:

a bus for communicating graphics information;

a memory communicatively coupled to the bus, the memory for storing the graphics information; and a processor communicatively coupled to the bus, the processor for processing information, including performing a tight depth range pixel value occlusion prediction for utilization in graphics rendering, wherein the processor processes the graphics information in a pipeline sequence and an output of said tight depth range pixel value occlusion prediction includes an underrange and overrange bit, wherein said underrange and overrange bit indicate if a depth solution is under or over an encoding, and culling associated with said tight depth range pixel value occlusion prediction is suspended until a next frame if a depth value associated with said tight depth range value occlusion prediction changes non-monotonically.

12. A graphics processing system of claim 11 wherein the processor compares pre-cull values to end of graphics processing pipeline occlusion values to analyze if pre-cull pixel values should be culled.

13. A graphics processing system of claim 12 wherein the cull values are associated with a prediction area.

14. A graphics processing system of claim 11 wherein the occlusion values are stored in an on chip register.

15. A computer readable reprogrammable tangible storage medium with instructions embedded thereon for causing a processor to perform graphics processing, the instructions comprising:

a rasterizer module for rasterizing pixels and performing a tight depth range occlusion prediction based upon a location and depth of a primitive, wherein outcodes are utilized in determining if a selected prediction area corner is inside said primitive, and said outcodes are sign bits of overlapping primitive edge equations at said selected prediction area corner, and culling associated with said tight depth range pixel value occlusion prediction is suspended until a next frame if a depth value associated with said tight depth range value occlusion prediction changes non-monotonically;

a shader module for shading remaining pixels; and a depth buffer module for discarding occluded pixels and storing visible pixels in a depth buffer for utilization in graphics rendering.

16. A computer readable reprogrammable tangible medium of claim 15 wherein the rasterizer module establishes which pixels are within bounds of a prediction area and which point of the prediction area corresponds to a maximum depth value.

17. A computer readable reprogrammable tangible medium of claim 16 wherein the tight depth range occlusion prediction obtains a depth range from corners of a prediction area, an intersection of an edge of said prediction area with an overlapping edge of a primitive, or vertices of said primitive.

18. A computer readable reprogrammable tangible medium of claim 16 wherein a Z value at said selected prediction area corner is utilized as a prediction maximum Z depth range value if a maximum Z prediction area corner outcode is 000.

* * * * *